(12) United States Patent
Rizzi

(10) Patent No.: US 11,312,437 B2
(45) Date of Patent: Apr. 26, 2022

(54) ADJUSTABLE SYSTEM FOR STABILIZING A BICYCLE

(71) Applicant: John Joseph Rizzi, Westportt, CT (US)

(72) Inventor: John Joseph Rizzi, Westportt, CT (US)

( * ) Notice: Subject to any disclaimer, the term of this patent is extended or adjusted under 35 U.S.C. 154(b) by 16 days.

(21) Appl. No.: 16/662,139

(22) Filed: Oct. 24, 2019

(65) Prior Publication Data

US 2020/0385076 A1  Dec. 10, 2020

Related U.S. Application Data

(60) Provisional application No. 62/853,201, filed on May 28, 2019.

(51) Int. Cl.
| | |
|---|---|
| *B62H 1/02* | (2006.01) |
| *B62H 5/14* | (2006.01) |
| *G06F 11/36* | (2006.01) |
| *G06F 8/71* | (2018.01) |
| *G06N 20/00* | (2019.01) |
| *G06F 8/41* | (2018.01) |
| *G06F 11/34* | (2006.01) |
| *G06F 21/57* | (2013.01) |

(52) U.S. Cl.
CPC .............. *B62H 1/02* (2013.01); *B62H 5/142* (2013.01); *G06F 8/433* (2013.01); *G06F 8/71* (2013.01); *G06F 11/3438* (2013.01); *G06F 11/3604* (2013.01); *G06F 21/577* (2013.01); *G06N 20/00* (2019.01)

(58) Field of Classification Search
CPC . B62H 1/02; B62H 1/04; B62H 5/142; B62H 5/144; B62K 21/08

USPC .................. 211/5, 17–24; 280/272
See application file for complete search history.

(56) References Cited

U.S. PATENT DOCUMENTS

| | | | |
|---|---|---|---|
| 536,835 A | 4/1895 | Krusche | |
| 554,454 A | 2/1896 | McKanna | |
| 672,401 A * | 4/1901 | Axel | B62H 1/02 280/298 |
| 1,055,581 A * | 3/1913 | Webb | B62K 3/002 280/296 |
| 2,415,735 A * | 2/1947 | Fastborg | B62H 5/06 280/272 |
| 4,185,850 A * | 1/1980 | Levine | B62H 1/00 280/296 |
| 4,595,214 A * | 6/1986 | Downing | B62L 1/04 188/24.11 |

(Continued)

FOREIGN PATENT DOCUMENTS

WO  WO2011134309  11/2011

*Primary Examiner* — Ryan A Reis

(57) ABSTRACT

A light weight, automatic release, variably adjustable bicycle stabilizer is disclosed. The invention is comprised of five main parts: a first part being an adjustable, pivoting, slightly flexible u-shaped fork that stabilizes the wheel; a second part being an anchor bracket; a third part being a down tube stabilizer; a fourth part being a compression band; and a fifth part being an onboard, LED, safety light. The invention is selectively affixed to the underside of a bicycle frame. The anchor is disposed on the down tube and the slightly flexible u-shaped fork wheel stabilizer swings out from said anchor and grabs the front wheel preventing the wheel from turning and tipping the bike over. The end of each fork is wider on the inside. This stops the bicycle from rolling backward when parked on an incline.

18 Claims, 7 Drawing Sheets

(56) References Cited

U.S. PATENT DOCUMENTS

| | | | | |
|---|---|---|---|---|
| 4,603,875 A | * | 8/1986 | Boughton | B62H 3/04 |
| | | | | 188/24.11 |
| 10,472,010 B2 | * | 11/2019 | Gilomme | B62H 5/20 |
| 10,654,403 B2 | * | 5/2020 | Santucci | B60Q 1/18 |
| 2008/0022735 A1 | * | 1/2008 | Hood | B62H 5/14 |
| | | | | 70/233 |

* cited by examiner

ADJUSTABLE SYSTEM FOR STABILIZING A BICYCLE

FIELD OF THE INVENTION

The present invention generally relates to bicycles. More specifically, it relates to devices that holds the front wheel assembly of a bicycle in place. Maintaining the wheel and fork assembly within the same plane as the bicycle, thus prevent tipping when parked and stationary.

BACKGROUND

The first documented "kickstand" invention was developed by Albert Berruyer in the late 1800s as bicycles became popular. In the decades to follow, many varieties of such stands were developed: some were mounted below the handlebars and were much longer than more recent designs. In the early 1900s, Pardon Tillinghast developed a stand mounted on a pedal and folded up flat under the pedal when not in use. Between the 1930s and 1970s, kickstands were comprised of a single leg that simply flipped out to one side (usually the left side) and the bike then leaned against it. These side stands were mounted to the chain stays behind the bottom bracket or to a chain and seat stay near the rear hub. Today, kickstands on bicycles are not as popular because bicycles are lighter and many riders are concerned about extra weight; however, inventors have come up with alternative methods to support a bike when not in use. U.S. Pat. No. 536835A granted to Krusghke disclosed a two-part kickstand in which one portion was affixed to the down tube and another portion was affixed to the bottom bracket, however did not accommodate wheels of different diameters and widths. U.S. Pat. Nos. 4603875A and 554454A granted to Matthew S. BoughtonMark T. La Plante (later assigned to the Cannondale Corporation) and McKanna respectively, developed front wheel braces that affix to the shift levers on the down tube and uses compression to stabilize the wheel—they do not support a wheel by the tire's sidewalls. U.S. Pat. Nos. 4,185,850A and 4,595,214A granted to Edward Levine & Dixon Newbold and the Raleigh Cycle Co. of America respectively also developed a front wheel braces that affix to the down tube and uses compression to stabilize the wheel but does not support a wheel by the tire's sidewalls and does not accommodate different shape and size bicycles. International Patent Number WO2011134309S discloses a device attached to the fork of the bicycle and has a u-shaped bracket that engages with the top tube to lock the handlebar assembly in a plane. This invention does not prevent the front wheel from rotating and cannot accommodate different sized down tubes on bicycles.

SUMMARY OF THE INVENTION

The device herein disclosed and described provides a solution to the shortcomings in the prior art, through the disclosure of an automatic release, variably adjustable bicycle stabilizer. The object of the invention is to prevent a bicycle from tipping over when parked and leaning (against a wall etc.). When bicycles are leaned when parked, the front wheel assembly tends to turn causing the bicycle to roll and subsequently fall over potentially damaging the bicycle. The invention locks the front wheel and fork assembly in line with the rear wheel axis thereby preventing the bicycle from rolling and falling. The invention prevents the front wheel from moving laterally. Such movement can create a tipping point for the bicycle and the momentum can override the stand and the bike will fall over. The enlarged tips of the fork prevent the invention from disengaging when parked on a slight incline. These issues are critically important when there is added weight on the bicycle and can tip the bicycle if the front tire is not properly secured.

Another object of the invention is to provide a means to lock the front wheel by gripping the sidewalls of the tire. The invention has a swinging, wheel stabilizer with a slightly flexible, u-shaped fork that grips the tire at each side. This gripping may cause less stress on the tire than other inventions that apply compression directly to the base of the tire along a single point.

Another object of this invention is to allow a user to secure wheels of varying diameters and tire thicknesses. The swinging, wheel stabilizer has rails that are slightly flexible u-shaped fork and are wider at the base than at the top. As a user swings the wheel stabilizer onto the tire, they can swing it until it engages the tires of varying thicknesses. The fork-shaped rails are designed to flex to accommodate and secure different sized wheels. Wheels can include but are not limited to those with road bike tires, cruiser tires, gravel and off-road tires.

Another object of the aforementioned invention is to allow the swinging, wheel stabilizer to be released quickly and automatically. Once ready to ride, the user can simply push on the bike's handle bars which will roll the front wheel forward allowing it to roll out of the stabilizer's grip. The stabilizer will snap back secured against the down tube. Many other inventions that require manual disengagement before riding create a potential for damaging the bicycle when it is ridden before manually-releasing the stand.

Another object of the aforementioned invention is to provide a means to allow the invention to be affixed to a varietal of down tube diameters and shapes (such as large-diameter, small-diameter and aerodynamic-shaped bicycle frames etc.). The invention's anchor base (that holds the swinging, wheel stabilizer onto the bicycle frame) is flexible and can accommodate different tube diameters and shapes. In addition, the base attachment system comes with a wraparound band and double-sided removable tape. This combination of elements prevents the fork from twisting when torsion force is applied. The application of tape and/or band to create a unique combination that holds the bracket in place without twisting the slightly flexible u-shaped fork around the axis of the down tube when the fork is under load of the stationary front wheel.

Another object of the aforementioned invention is to provide additional safety lighting the front and sides of the bicycle. When a user is required to secure the device at night. A small LED is located proximally on the swinging; wheel stabilizer allowing a user to be sure it grips the front wheel properly.

Another object of the invention is to allow the invention to be easily stowed when not in service. The swinging, wheel stabilizer pivots up onto the anchor base and the down tube and is out of the way during bicycle operations. A torsion spring wound around the axle and held in with indents locks the rigid, yet slightly flexible u-shaped fork in place and prevents it from moving around when riding.

Another object of the aforementioned invention is to allow to users to install the invention without the use of tools. The combination of special adhesives and strategic installation makes it very simple and effective to operate.

Another object of the aforementioned invention is to minimize weight. The complete invention weighs less than one ounce (28.35 grams). The ratio of weight-to-price is critical with bicycles. The lighter the bicycle weight—the better the performance and the more expensive the bike. This invention conforms to this principal.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways, which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features.

DETAILED DESCRIPTION OF FIGURES

Figure 1:
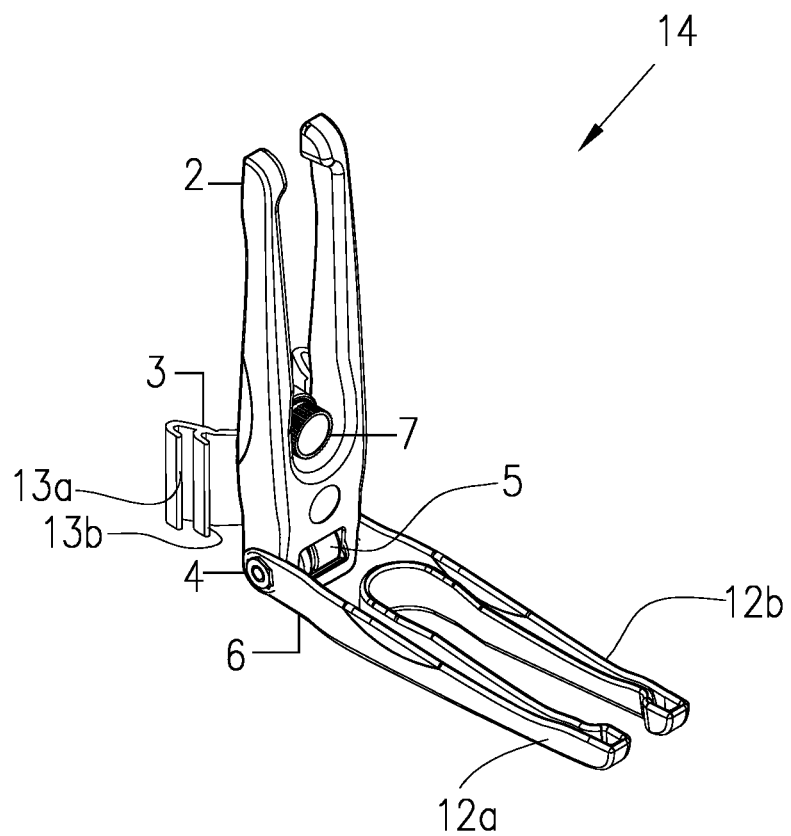
FIG. 1 shows a front perspective view of the invention.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. Conventional components of the invention are elements that are well known in the prior art and will not be discussed in detail for this disclosure.

Figure 2:
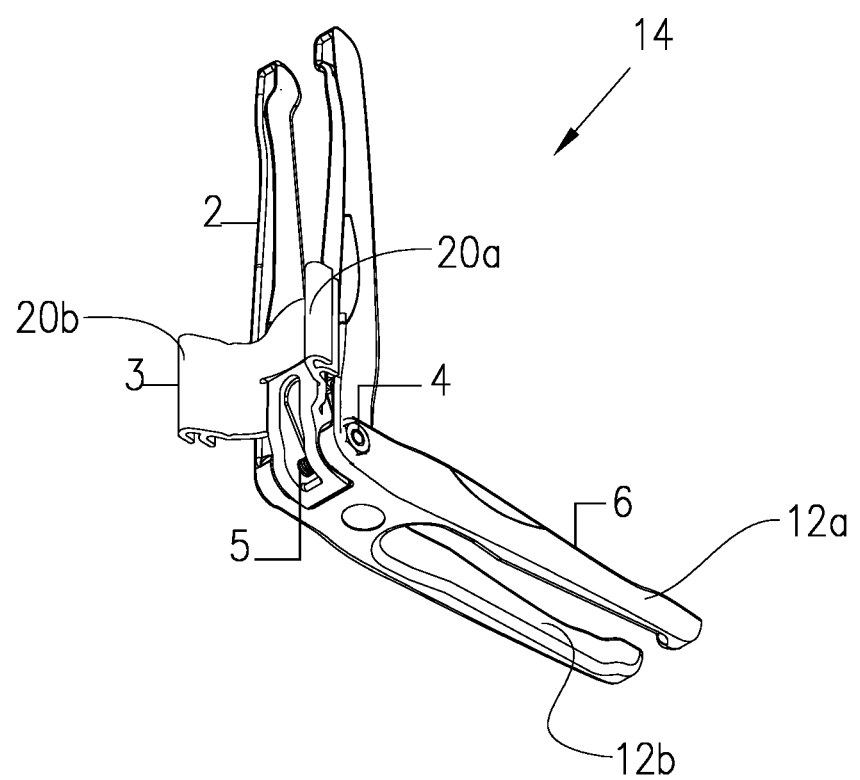
FIG. 2 shows a rear perspective view of the invention.
Figure 3:
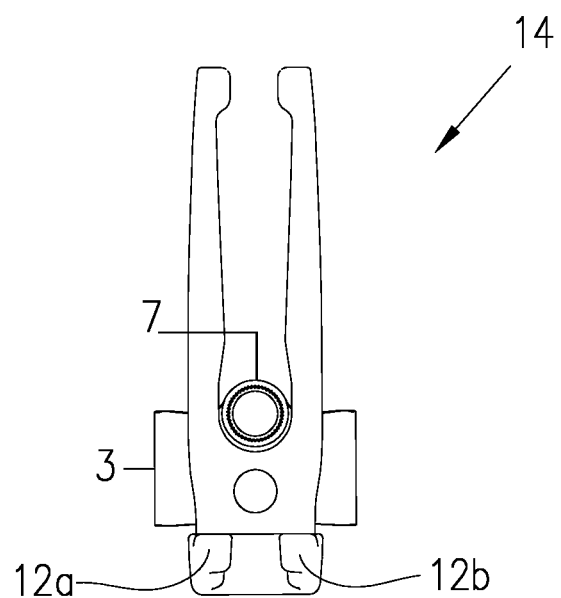
FIG. 3 illustrates a front view of the invention.
Figure 4:
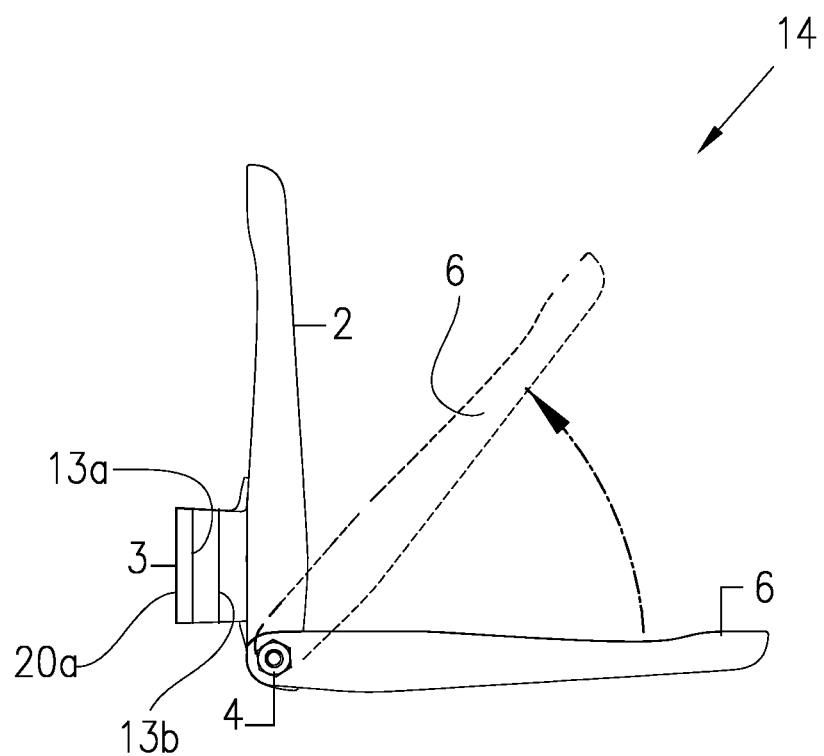
FIG. 4 shows a side view of the invention.
Figure 7:
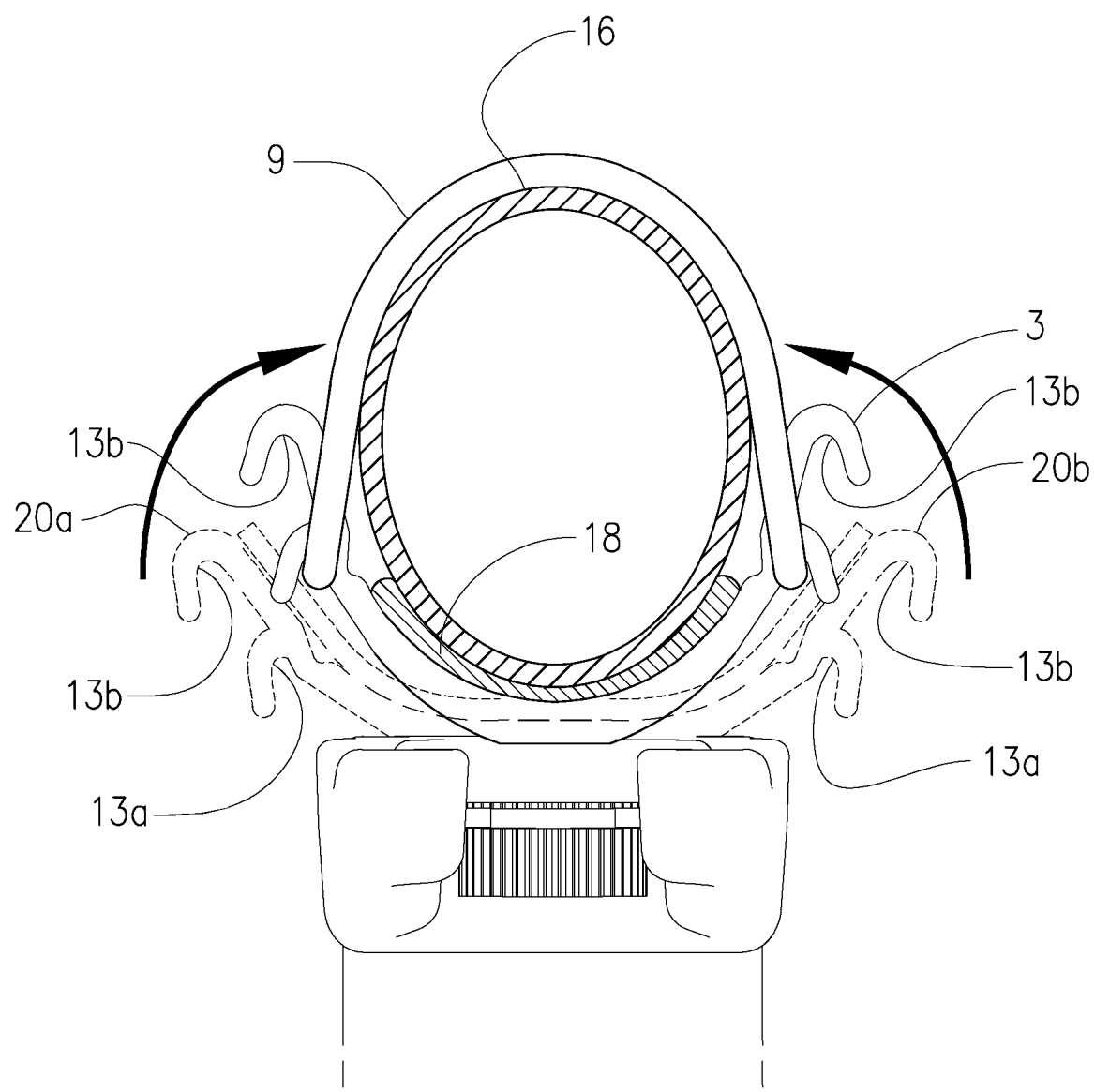
FIG. 7 shows a section view of the invention.

FIGS. 1 and 2 showing perspective views of the preferred embodiment of the invention generally being comprised of an L-shaped bracket 14 having a down tube stabilizer 2 with anchor bracket 3; and an adjustable, pivoting, wheel stabilizer 6 being pivotally-connected by axle 4 there between. The aforementioned axle 4 also being spring-loaded allowing the wheel stabilizer 6 to contract when not in use. Said down tube stabilizer 2; and wheel stabilizer 6 being U-shaped with at least, but not limited to, two, parallel tine members 12a and 12b and being made of a medium, durometer material such as plastic and the like allowing them to expand and contract slightly to accommodate different sized down tubes and tires. FIGS. 3 and 4 showing a front view and side view of the invention respectively, with anchor bracket 3, also being U-shaped and having two barbs 13a and 13b on each of its distal ends 20a and 20b to accept a compression band 9 (that wraps around and grips a down tube) and being made of a slightly flexible material—such as plastic and the like, allowing them to expand and contract slightly to accommodate different sized down tubes. FIG. 3 also showing an onboard LED 7 being disposed proximally within down tube stabilizer 2 and having its own battery power source therein. FIG. 4 shows a side view anchor bracket 3 having at least two barbs 13a and 13b on distal ends. This arrangement minimizes the need for many sizes of bands. The two sets of barbs can be used to attach the bands tight enough to hold the bracket in place to hold a bike stationary. Other embodiments may incorporate a double-sided adhesive strip that may be selectively affixed to the anchor bracket 3 to aid in rigidly affixing the L shaped bracket 14 to the down tube 16 of a bicycle 10. FIG. 7 showing a section view of said anchor bracket 3 with compression band 9 flexing and allowing it to secure different sized down tubes 16.

Figure 5:
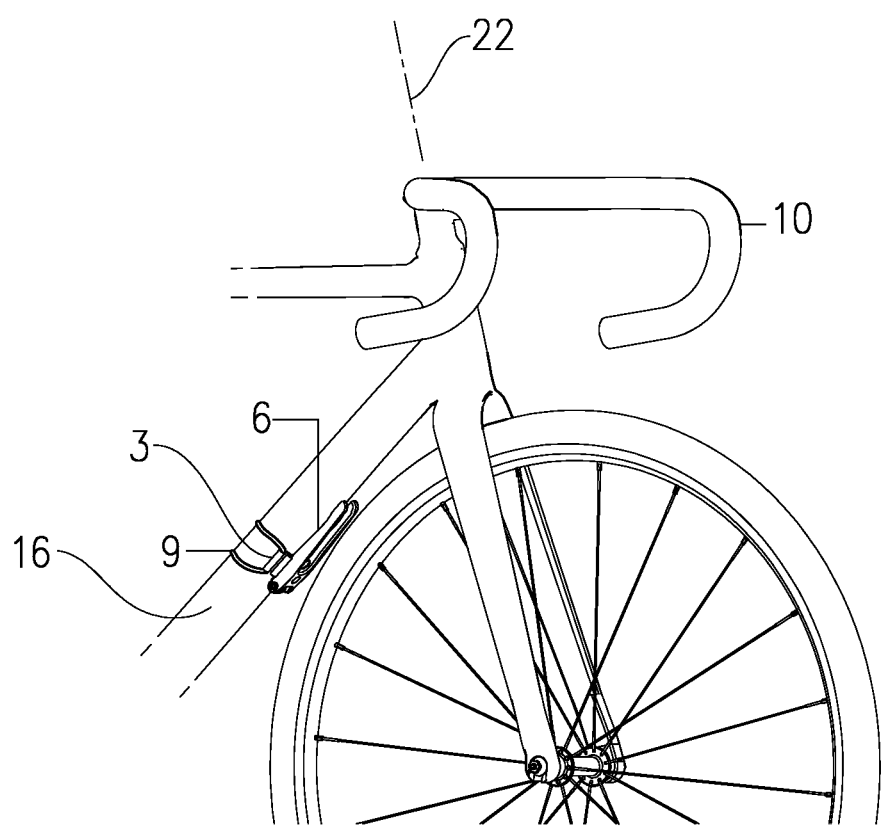
FIG. 5 shows a view of the swinging, wheel stabilizer in the contracted position.
Figure 6:
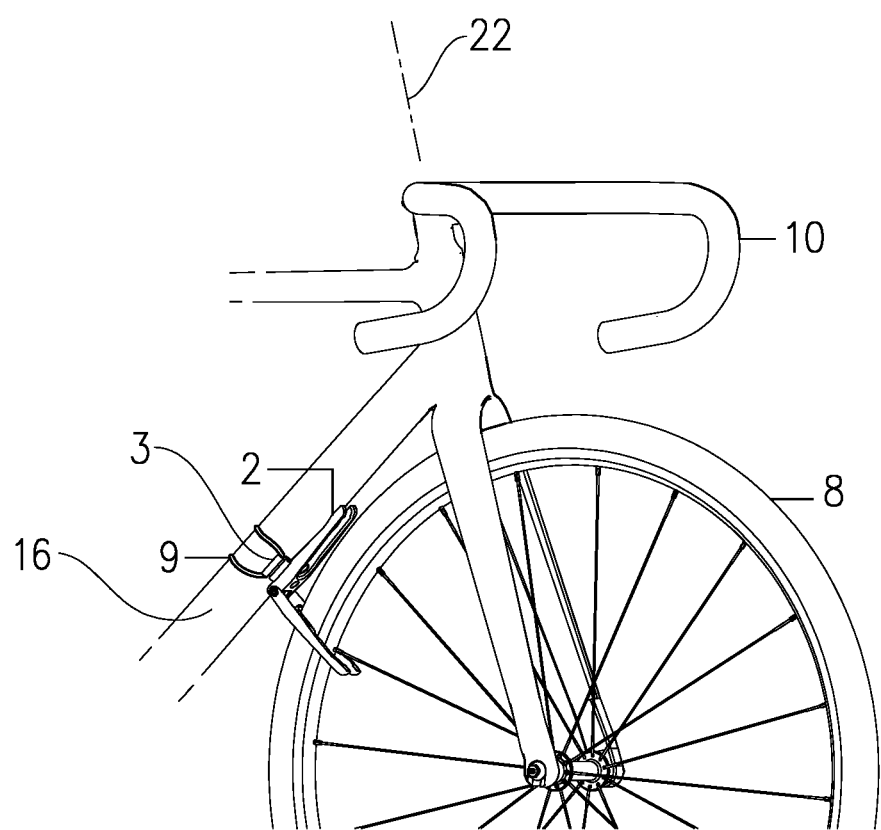
FIG. 6 shows a view of the swinging, wheel stabilizer in the extended position.

FIGS. 5 and 6 showing perspective views of the invention installed on bicycle 10 with compression band 9 selectively and rigidly affixing it to the down tube 16. Said compression band 9 wrapping around the down tube 16 and engaging barbs 13a and/or 13b on the anchor bracket 3. Other embodiments of the invention may incorporate an adhesive strip 18 on anchor bracket 9 to limit its movement relative to the down tube 16. FIG. 6 showing the wheel stabilizer 6 in the extended position to be gripping and holding the front wheel 8 within the steering axis 22 of the bicycle and preventing it from rotating about steering axis 22 when the bicycle 10 is leaned against a vertical surface there on. The wheel stabilizer 6 being automatically disengaged from front wheel 8 when the user pushes the bicycle forward. Once disengaged, said wheel stabilizer 6 retracting toward the down tube as biased by means of a torsion spring 5 configured inside axle.

FIG. 7 Shows an enlarged section view of the invention interface selectively affixed to a down tube 16 of a bicycle. The flexibility of said anchor bracket 3 is shown to accommodate different-sized bicycle down tubes.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A bicycle stand including:
   a u-shaped wheel stabilizer;
   an anchor bracket configured to be connected to a down tube of a bicycle;
   a compression band;
   an onboard LED light;
   wherein the compression band serves to provide connection between the anchor bracket and the down tube;
   the wheel stabilizer may be pivoted relative to the anchor bracket between: (i) an engaged position wherein the wheel stabilizer is configured to be engaged with a wheel of a bicycle; and (ii) a retracted position wherein the wheel stabilizer is disengaged from the wheel;
   wherein, in the engaged position, the bicycle stand serves to restrict movement of the wheel relative to the down tube; and
   wherein, in the retracted position, the restriction of movement of the wheel by the bicycle stand is removed.

2. The bicycle stand of claim wherein the wheel stabilizer is pivotally connected to the anchor bracket.

3. The bicycle stand of claim 1, wherein the wheel stabilizer includes at least two tine members.

4. The bicycle stand of claim 3 wherein tine members are generally parallel.

5. The bicycle stand of claim 1, including a spring to bias the pivoting of the wheel stabilizer about a longitudinal axis.

6. The bicycle stand of claim 1, wherein the anchor bracket includes at least two sets of barbs configured to receive the compression band.

7. The bicycle stand of claim 1, wherein the onboard LED is affixed to the anchor bracket.

8. The bicycle stand of claim 1, wherein the onboard LED has its own power source.

9. A method of stabilizing a bicycle while leaning on a vertical surface, the method comprised of:
   (a) providing the bicycle stand of claim 1 and selectively affixing the anchor bracket to the down tube of the bicycle, with the wheel stabilizer in the retracted position;
   (b) displacing the wheel stabilizer to the engaged position;
   the displacement of the wheel stabilizer to the engaged position serves to restrict movement of the wheel relative to the down tube;
   the restriction of movement of the wheel includes preventing the wheel from rolling;
   the restriction of movement of the wheel includes preventing the wheel from turning about a steering axis,
   (c) utilizing the onboard LED to illuminate the front and sides of the bicycle; and
   (d) displacing the wheel stabilizer to the retracted position.

10. The method of claim 9, including utilizing the compression band to connect the anchor bracket to the bicycle down tube such that the compression band is wrapped around the bicycle down tube and connected to barbs on the anchor bracket.

11. The method of claim 10, wherein the anchor bracket is flexible such that it may be flexed to accommodate a multitude of down tube sizes.

12. The method of claim 9, wherein the wheel stabilizer includes at least two tine members, the wheel stabilizer is flexible such that the tine members laterally grip a tire of the wheel when the bicycle stand is in the engaged position.

13. The method of claim 12, wherein the lateral grip serves to restrict the wheel from rolling.

14. The method of claim 12, wherein the tine members serve to restrict the wheel from turning about the steering axis when the bicycle stand is in the engaged position.

15. The method of claim 9, wherein the onboard LED serves to illuminate the wheel.

16. The method of claim 9, wherein rolling the bicycle forward serves to displace the wheel stabilizer from the engaged position to the retracted position.

17. The method of claim 9, including a spring to bias the pivoting of the wheel stabilizer about a longitudinal axis toward the retracted position.

18. The method of claim 13, wherein the lateral grip serves to restrict the bicycle from rolling backwards and from disengaging the wheel stabilizer from the tire.

* * * * *